United States Patent [19]
Grate et al.

[11] Patent Number: 6,015,869
[45] Date of Patent: Jan. 18, 2000

[54] STRONGLY HYDROGEN-BOND ACIDIC POLYMER AND METHODS OF MAKING AND USING

[75] Inventors: Jay W. Grate, West Richland; Steven N. Kaganove, Kennewick, both of Wash.

[73] Assignee: Battelle Memorial Institute, Richland, Wash.

[21] Appl. No.: 09/040,541

[22] Filed: Mar. 17, 1998

[51] Int. Cl.$^7$ .................................................... C08G 77/08
[52] U.S. Cl. ................. 528/15; 528/25; 528/31; 528/32
[58] Field of Search ................. 528/15, 25, 31, 528/32

[56] References Cited

U.S. PATENT DOCUMENTS

| | | | |
|---|---|---|---|
| 5,541,278 | 7/1996 | Raleigh et al. | 528/15 |
| 5,726,271 | 3/1998 | Furukawa et al. | 528/15 |

OTHER PUBLICATIONS

MH Abraham, I Hamerton, JB Rose and JW Grate, Hydrogen Bonding Part 18. Gas Liquid Chromatographic Measurements for the Design and Selection of Some Hydrogen Bond Acidic Phase Suitable for Useas Coatings on Piezoelectric Sorption Detectors, J. Chem. Soc. Perkin Trans. 2, (1991) 1417–1423.

L. J. Mathias, and C. M. Lewis, Unexpectedly Rapid Hydrosilation Polymerization of the Diallyl Derivative of Bisphenol–A and 2, 6–Diallylphenol, *Macromolecules*, 26 (1993) 4070–4071.

*Primary Examiner*—Melvyn I. Marquis
*Attorney, Agent, or Firm*—Paul W. Zimmerman

[57] ABSTRACT

The present invention is a sorbent polymer with the (AB)n sequence where the fluorinated interactive A segment is fluoroalkyl-substituted bisphenol and the oligosiloxane B segment is an oligodimethylsiloxane. More specifically, the fluoroalkyl-substituted bisphenol contains two allyl groups and the oligodimethylsiloxane has terminal Si—H groups. The sorbent polymer may be used as thin films on a variety of chemical sensors, or as a component of a thin film on a chemical sensor. Crosslinked sorbent polymers are processable into stable thin films on sensor devices. Sorbent polymers are also useful in sensor arrays, in surface acoustic wave sensors, and in cladding of optical fibers. Sensor arrays provide better selectivity than single sensors and permit identification and quantification of more than one species in a mixture. The sorbent polymer is synthesized by hydrosilylation polymerization which is achieved by catalyzed heating.

27 Claims, 9 Drawing Sheets

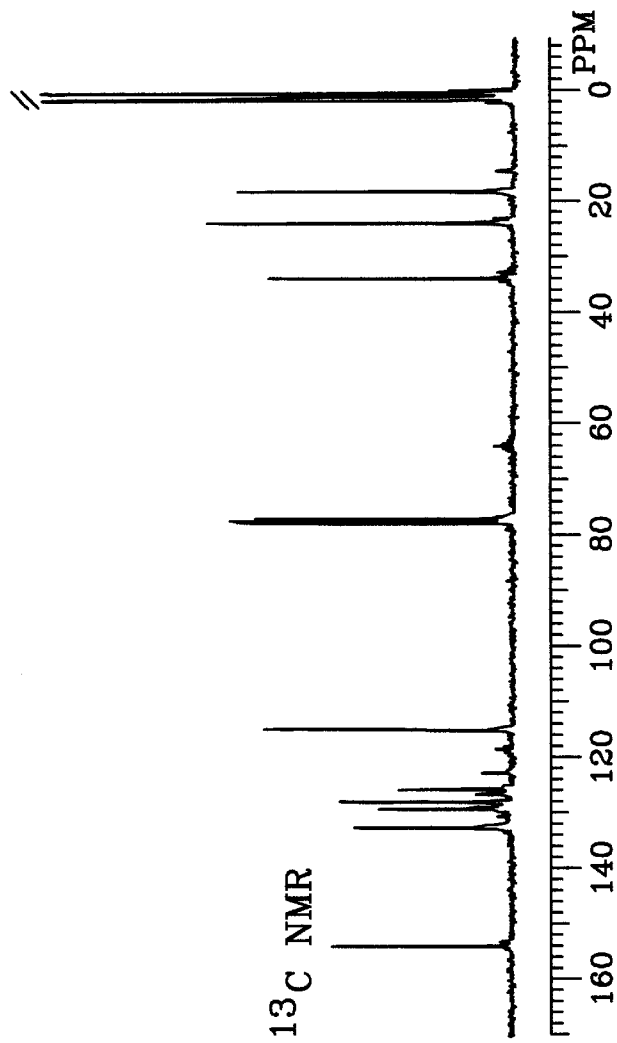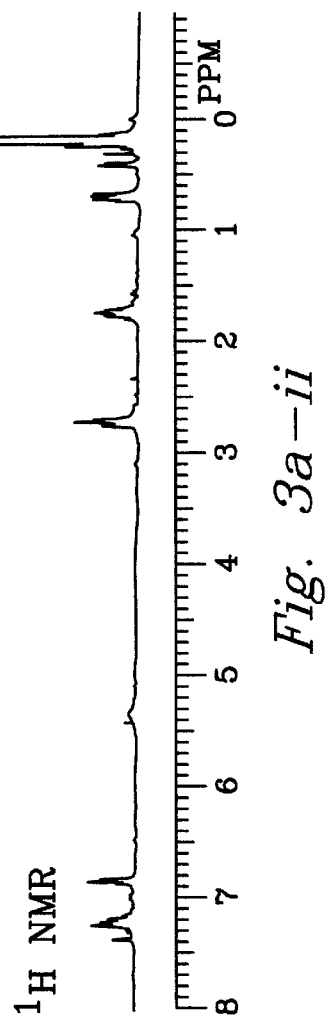
Fig. 3a-i
Fig. 3a-ii

STRONGLY HYDROGEN-BOND ACIDIC POLYMER AND METHODS OF MAKING AND USING

This invention was made with Government support under Contract DE-AC0676RLO1830 awarded by the U.S. Department of Energy. The Government has certain rights in the invention.

FIELD OF THE INVENTION

The present invention relates generally to a strongly hydrogen bond acidic polymer with a low glass transition temperature, specifically a sorbent polymer containing alternating bisphenol and oligosiloxane units, and more specifically a sorbent polymer containing alternating fluorinated bisphenol and oligosiloxane units. The sorbent polymer is useful as a sorbent phase for analytical applications, as a sorbent material for analytical separations such as chromatography, and as a sorbent material for chemical sensors.

BACKGROUND OF THE INVENTION

Presently, there are few if any commercially available sorbent polymers that have strong hydrogen bond acidic properties. Moreover, there are none that have glass to rubber transition temperatures below room temperature. None of the conventional gas chromatographic stationary phases are strong hydrogen-bond acids, and those that are more modest hydrogen-bond acids (docosanol, sorbitol, and diglycerol) are not polymers.

In the paper FLUORALCOHOL- AND FLUOROPHENOL-CONTAINING POLYMERS FOR ACOUSTIC WAVE AND OPTICAL SENSORS, J W Grate, S N Kangrove, S J Patrash, B M Wise, ECS Meeting Abstracts Volume 96-1, April 1996, it is reported that experimental chemical sensors have been made using hydrogen bond acidic polymers as the sorbent material to collect and concentrate hydrogen bond basic vapors on the sensor surface. For example, an oligomeric epoxy dubbed "fluoropolyol" has been used for the detection of basic vapors such as organophoshorus compounds using surface acoustic wave (SAW) sensors, a result attributed to hydrogen bonding interactions. Fluropolyol was originally developed at the Naval Research Laboratory(NRL) as a component of epoxy paints, and NRL has remained the sole source of this material for sensor studies. Fluoropolyol has also been used in sensor arrays for classifying organophosphorus compounds, and fluoropolyol was used in a smart sensor array system for detecting these compounds as reported in A. W. Snow, L. G. Sprague, R. L. Soulen, J. W. Grate, and H. Wohltjen, Synthesis and evaluation of hexafluorodimethylcarbinol functionalized polymers as microsensor coatings, *J. Appl. Poly. Sci.*, 43 (1991) 1659–1671; J. W. Grate, A. Snow, D. S. Ballantine, H. Wohltjen, M. H. Abraham, R. A. McGill, and P. Sasson, Determination of partition coefficients from surface acoustic wave vapor sensor responses and correlation with gas-liquid chromatographic partition coefficients, *Anal. Chem.*, 60 (1988) 869–875; D. S. Ballantine, S. L. Rose, J. W. Grate, and H. Wohltjen, Correlation of surface acoustic wave device coating responses with solubility properties and chemical structure using pattern recognition, *Anal. Chem.*, 58 (1986) 3058–3066; J. W. Grate, M. Klusty, R. A. McGill, M. H. Abraham, G. Whiting, and J. Andonian-Haftvan, The predominant role of swelling-induced modulus changes of the sorbent phase in determining the responses of polymer-coated surface acoustic wave vapor sensors, *Anal. Chem.*, 64 (1992) 610–624; S. L. Rose-Pehrsson, J. W. Grate, D. S. Ballantine, and P. C. Jurs, Detection of hazardous vapors including mixtures using pattern recognition analysis of responses from surface acoustic wave devices, *Anal. Chem.*, 60 (1988) 2801–2811; and J. W. Grate, S. L. Rose-Pehrsson, D. L. Venezky, M. Klusty, and H. Wohltjen, A smart sensor system for trace organophosphorus and organosulfur vapor detection employing a temperature-controlled array of surface acoustic wave sensors, automated sample preconcentration, and pattern recognition, *Anal. Chem.*, 65 (1993) 1868–1881. Fluoropolyol has also been used as a component of a polymer/phthalocyanine composite Langmuir-Blodgett films on chemiresistor sensors as reported by J. W. Grate, M. Klusty, W. R. Barger, and A. W. Snow, Role of selective sorption in chemiresistor sensors for organophosphorous detection, *Anal. Chem.*, 62 (1990) 1927–1924. The use of fluoropolyol in these and other applications has made it the de facto standard for hydrogen-bond acidic SAW sensor coatings. Fluoropolyol has a glass transtition temperature of 10° C.

Experimental chemical sensors have been made using organic polymers based on poly(styrene) and poly(isoprene) polymer backbones with pendant hexafluoroisopropanol (HFIP) groups, where the HFIP group provides strong hydrogen bond acidic properties as reported by Snow et al. (cited above) and J. W. Barlow, P. E. Cassidy, D. R. Lloyd, C. J. You, Y. Chang, P. C. Wong, and J. Noriyan, Polymer sorbents for phosphorus esters: II. Hydrogen bond driven sorption in fluoro-carbinol substituted polystyrene, *Polym. Eng. Sci.*, 27 (1987) 703–715; Y. Chang, J. Noriyan, D. R. Lloyd, and J. W. Barlow, Polymer sorbents for phosphorus esters: I. Selection of polymers by analog calorimetry, *Polym. Eng. Sci.*, 27 (1987) 693. These materials on SAW devices afforded vapor sensors with high sensitivities to organophosphorus compounds, but both the parent polymers and the HFIP-containing materials were glassy at room temperature. This property limits the vapor diffusion rate in the polymer, resulting in sensors that are slow to respond and recover.

An HFIP-containing polymer based on a polysiloxane backbone has been described and demonstrated to be a good hydrogen-bond acid on the basis of inverse chromatography and linear salvation energy relationship (LSER) studies by M. H. Abraham, J. Andonian-Haftvan, C. M. Du, V. Diart, G. Whiting, J. W. Grate, and R. A. McGill, Hydrogen Bonding. XXIX. The characterisation of fourteen sorbent coatings for chemical microsensors using a new salvation equation, *J. Chem. Soc., Perkin Trans.* 2, (1995) 369–378. The polysiloxane backbone provides a material with a Tg well below room temperature. However, there are few if any published data on the performance of this material on a chemical sensor, and methods to adjust the physical properties of the material, or to crosslink the material, have not been described. In addition, the synthesis of this polymer requires the use of hexafluoroacetone, an extremely toxic reagent.

Phenolic liquids have been shown to be sorbents with hydrogen bond acidic properties. Specifically, the phenolic liquids were derivatives of bisphenol-A and fluoroalkyl-substituted bisphenol with pendant allyl groups or with pendent propyl groups were reported by M. H. Abraham, I. Hamerton, J. B. Rose, and J. W. Grate, Hydrogen is bonding Part 18. Gas-liquid chromatographic measurements for the design and selection of some hydrogen bond acidic phases suitable for use as coatings on piezoelectric sorption detectors, *J. Chem. Soc. Perkin Trans.* 2, (1991) 1417–1423. The flourinated bisphenol compounds were significantly more acidic than the bisphenol compounds without the fluorination. However, the bisphenol compounds are in a liquid form that is difficult to deploy as a sensing material. The liquids do not form stable thin film. The liquids have a finite vapor pressure and evaporation (albeit slowly) causes drift in sensor baseline and reductions in sensitivity.

A polymer containing bisphenol units in the backbone (FIG. 1a) has been synthesized. Mathias reported in a short communication in 1993 that a non-fluorinated bisallyl derivative of bisphenol-A (1a) underwent rapid hydrosilylation with 1,1,3,3-tetramethyldisiloxane and 1,1,3,3,5,5-hexamethyltrisiloxane (2) at ice-bath temperature yielding polymers with alternating bisphenol and oligosiloxane units (3), L. J. Mathias, and C. M. Lewis, Unexpectedly Rapid Hydrosilation Polymerization of the Diallyl Derivative of Bisphenol-A and 2,6-Diallylphenol, Macromolecules, 26 (1993) 4070–4071. The reaction was strongly exothermic at ice bath temperatures, with high conversion to polymer in seconds to minutes. The glass transition temperature of this polymer was reported to be −29C. This polymer was not crosslinked. It has not been used as the sorbent phase on a chemical sensor. Although the phenolic hydroxyl groups make this polymer hydrogen bond acidic, it cannot be considered strongly hydrogen bond acidic because the bisphenol units are not fluorinated.

M. H. Abraham, I. Hamerton, J. B. Rose and J. W. Grate, HYDROGEN BONDING PART 18. GAS LIQUID CHROMATOGRAPHIC MEASUREMENTS FOR THE DESIGN AND SELECTION OF SOME HYDROGEN BOND ACIDIC PHASE SUITABLE FOR USE AS COATINGS ON PIEZOELECTRIC SORPTION DETECTORS, J. Chem. Soc. Perkin Trans. 2, (1991) 1417–1423 showed using chromatographic studies of vapor sorption and linear solvation energy relationships (LSERs) that a fluoroalkyl-substituted bisphenol with pendant allyl groups, 1b (FIG. 1b), and a variant with pendent propyl groups, were significantly more acidic than similar compounds without the fluorination, such as 1a. The LSER b-coefficient, which measures hydrogen-bond acidity, was 4.56 for fluorinated 1b, compared to only 2.41 for unfluorinated 1a. Since these coefficients are used in an equation that predicts the logarithm of a partition coefficient, an increase in the b-coefficient of 2 units corresponds to increasing the extent of sorption due to the hydrogen bonding interaction by a factor of 100. Indeed the observed partition coefficients for ethylamine into 1b and 1a were 10,800 and 56, respectively, demonstrating the profound advantage in using the fluorinated material to promote the sorption of basic vapors.

In spite of the clear advantage of the fluroinated bisphenol, none of the prior art taught how a sorbent polymer with a fluorinated bisphenol group could be synthesized. Moreover, it was not known whether a fluorinated bisphenol would have the same reactivity as a non-fluorinated bisphenol under hydrosilylation polymerization conditions at ice bath temperatures.

Thus, before the present invention, hydrogen-bond acidic polymers with low glass to rubber transition temperatures for use in sensor arrays were not readily available. Strongly hydrogen bond acidic or sorbent polymers are needed in arrays for the sensitive detection of basic vapors, or to help discrimnate against basic vapors that may interfere with identification of other vapors of interest. Hence, there is a need for a strongly hydrogen bond acidic or sorbent polymer in a solid phase with a low glass to rubber transition temperature useful as a sorbent exhibiting rapid vapor diffusion.

SUMMARY OF THE INVENTION

The present invention is a sorbent polymer that is synthesized by a hydrosilylation polymerization with segments containing fluorinated interactive groups, A, alternating oligosiloxane segments, with B; hence the polymer has the sequence (AB)n. The fluorinated interactive A segments promote selective sorption of particular compounds, while the oligosiloxane B segments give the sorbent polymer desirable physical properties such as a low glass transition temperature. In addition other physical properties can be adjusted easily when synthesizing these sorbent polymers. Specifically, the present invention is a sorbent polymer with the (AB)n sequence where the fluorinated interactive A segment is fluoroalkyl-substituted bisphenol and the oligosiloxane B segment is an oligodimethylsiloxane. More specifically, the present invention is a sorbent polymer with the (AB)n sequence where the fluorinated interactive A segment is fluoroalkyl-substituted bisphenol containing two allyl groups and the oligosiloxane B segment is an oligodimethylsiloxane with terminal Si—H groups, and the sorbent polymer is synthesized using the hydrosilylation reaction.

It was advantageous that the addition of Si—H across a carbon-carbon double bond did not introduce any polar functionalities into the material: sorbent polymers were synthesized and crosslinked without altering the selectivity imparted to the material by interactive groups independently designed into the material. In addition, the hydrosilylation reaction is selective and tolerates many functional groups including but not limited to esters, nitriles, amines, amides, nitro, ketone, ether, phosphate, sulfide, sulfones, and combinations thereof. Thus, the present invention is suited for the design and synthesis of sorbent sensor materials with a variety of chemical and physical properties. Such sorbent materials may be used as thin films on a variety of chemical sensors, or as a component of a thin film on a chemical sensor. The sorbent polymer may serve as the matrix material in composite films containing additional components with a function in sensing and transduction; for example, additional components may give the film desirable optical or electronic properties. Such sorbent materials may be useful in other analytical applications where a selectively sorbent material is used: for example as the stationary phase in chromatography, or as the sorbent phase in solid phase microextraction (SPME).

Sorbent polymers with hydrogen-bond acidic properties are potentially useful because they sorb hydrogen bond basic vapors. The application of a sorbent thin film to a suitable electronic or optical device represents a general approach to the development of a chemical sensor. For the detection of organic vapors, sorbent polymers offer a number of advantages as the sorbent material. Diffusion of absorbed vapors within the material is quite rapid, provided that the glass-to-rubber transition temperature (Tg) is below the operating temperature of the sensor. Sorbent polymers are processable into thin films on sensor devices. The sorbent properties, and hence the chemical selectivities, of sorbent polymer materials vary with the chemical structure. For efficient sensor development, it is desirable to be able to select or design sorbent polymers so that they will absorb organic vapors of interest in a predictable manner, and to be able to tailor the physical properties of the material for the sensor application. For the sorption and detection of basic vapors, it is advantageous to incorporate strongly hydrogen-bond acidic functional groups into the sorbent polymer.

Hydrogen bond acidic or sorbent polymers are also useful in sensor arrays. Sensor arrays provide better selectivity than single sensors and permit identification and quantification of more than one species in a mixture. To be effective in a sensor array, each sensor must collect useful chemical information about the sample being sensed. The information is used to help detect and quantify species of interest, and to help discriminate against potentially interfering vapors. A sorbent polymer-based sensor array will collect the most chemical information if the polymers in the array cover the full range of solubility interactions, including dispersion, dipole-dipole, and hydrogen-bonding interactions.

The sorbent polymers of the present invention have strongly hydrogen bond acidic phenolic functionality for the strong sorption of basic compounds, and have glass transition temperatures below room temperature permitting rapid vapor diffusion through the sorbent polymer. Physical properties including but not limited to refractive index and viscosity may be controlled by adjusting the length of the oligosiloxane and the molecular weight. The sorbent polymers can be easily crosslinked to convert them from liquid or gummy materials to elastomers. These sorbent polymers can be applied to surfaces and devices as thin films. These sorbent polymers can be formulated for use on multiple types of sensor devices, including but not limited to acoustic wave devices and optical devices, and can be used as sorbents for analytical collection and separations.

Sorbent polymers of the present invention in the form of thin films placed on surface acoustic wave (SAW) sensors exhibit greater sensitivity than fluoropolyol for basic vapors including methyl ethyl ketone, N,N-dimethylformamide, and dimethyl methylphosphonate. Sensors made with these sorbent polymers had faster response times than sensors made with fluoropolyol. Sorbent polymers in the form of thin films have been successfully formulated as the cladding on optical fibers according to the present invention, and these optical fibers guided light as well as commercial plastic fibers or drawn silica fibers with polydimethylsiloxane claddings. Clad fibers can be used as chemical sensors or for vapor collection by SPME. Sorbent polymers in the form of thin films have been applied to the interior surface of silica capillary columns of the type used for chromatography.

The synthesis method of the present invention is hydrosilylation polymerization of a reactive mixture of a fluorinated bisphenol with a siloxane heated to an elevated temperature rather than cooled at ice bath temperature.

The hydrogen bond acidic sorbent polymers of the present invention have several advantages including: adjustable physical properties, for example molecular weight, viscosity, refractive index, and combinations thereof, for use in analytical applications on many sensor platforms, produce sensors that are more sensitive and faster to respond than sensors coated with fluoropolyol, synthesis does not require the use of highly toxic hexafluoroacetone as in the synthesis of the polysiloxane with HFIP groups.

It is an object of the present invention to prepare a strongly hydrogen-bond acidic sorbent polymer with low glass-to-rubber transition temperature.

It is an object of the present invention to prepare a sorbent polymer of a fluorinated bisphenol with alternating oligosiloxane segments.

It is an object of this invention to formulate the sorbent polymer so that it can be crosslinked.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 3a–i is a $^{13}C$ NMR spectra of polymer 9.

FIG. 3a–ii is a $^{1}H$ NMR spectra of polymer 9.

DESCRIPTION OF THE PREFERRED EMBODIMENT(S)

Figure 1A:
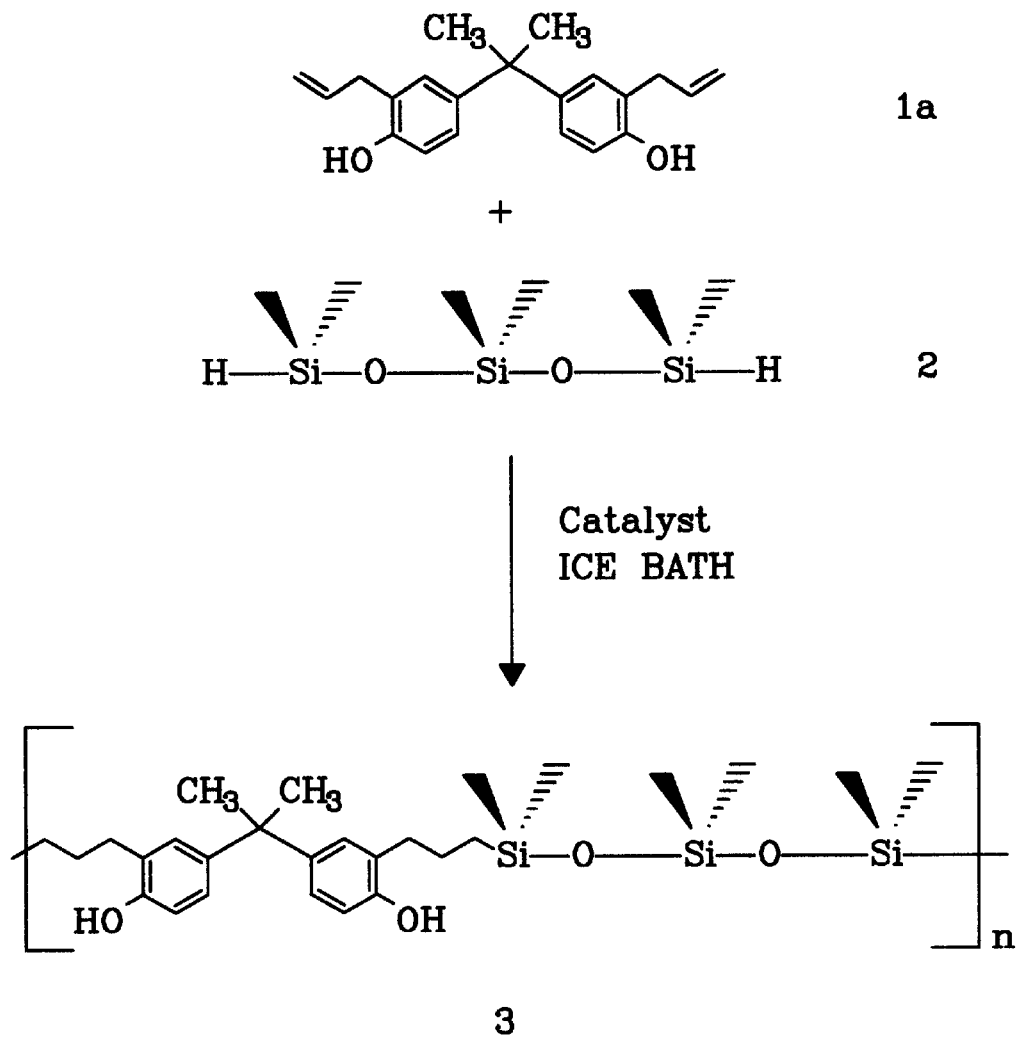
FIG. 1a is a chemical diagram of a prior art synthesis of a bisphenol-containing polymer.
Figure 1B:
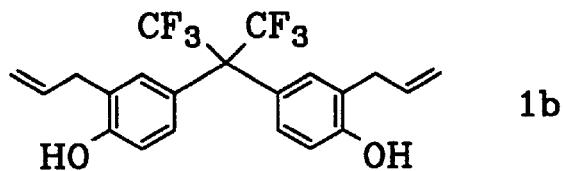
FIG. 1b is a chemical diagram of a prior art fluorinated bisphenol.
Figure 2:
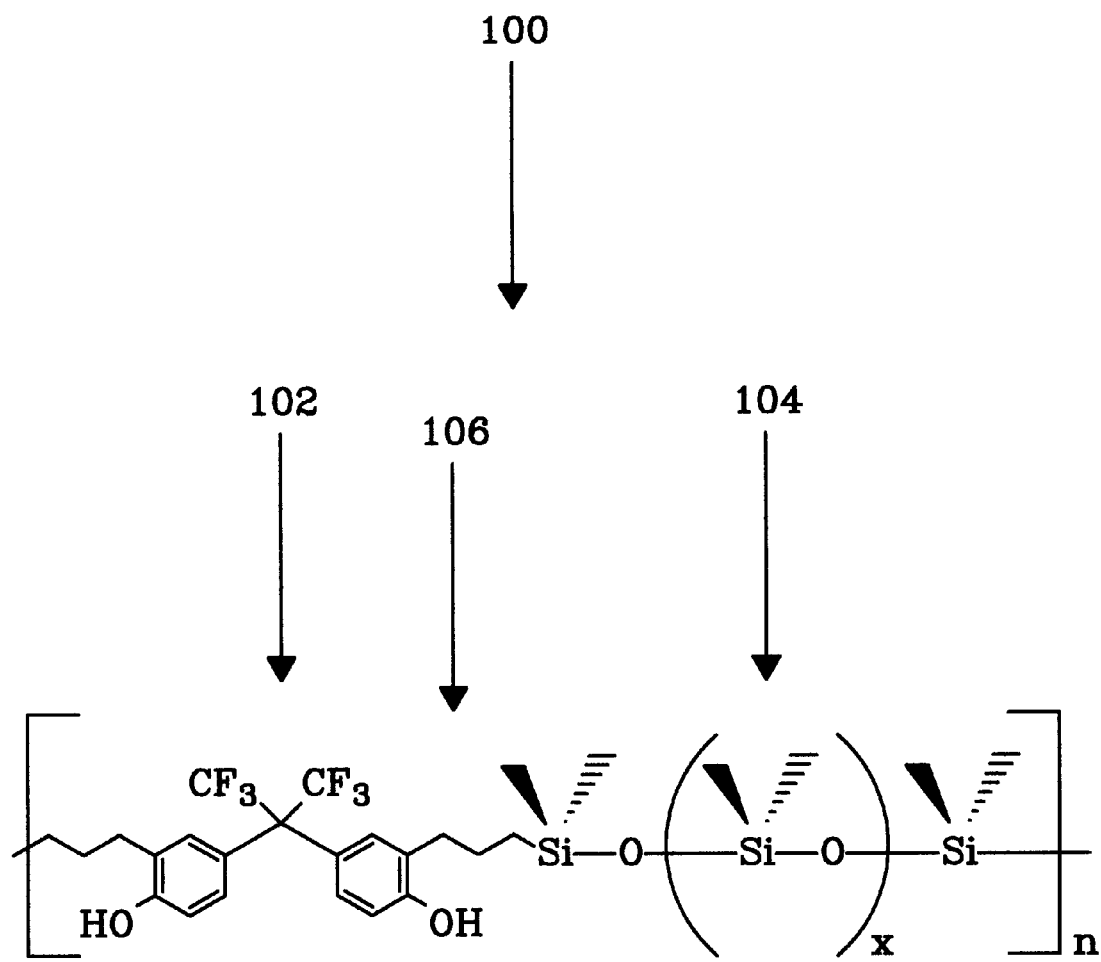
FIG. 2 is a chemical diagram of the sorbent polymer of the present invention having a repeat unit of fluorinated bisphenol alternating with an oligosiloxane connected with a carbon chain.
Figure 3:
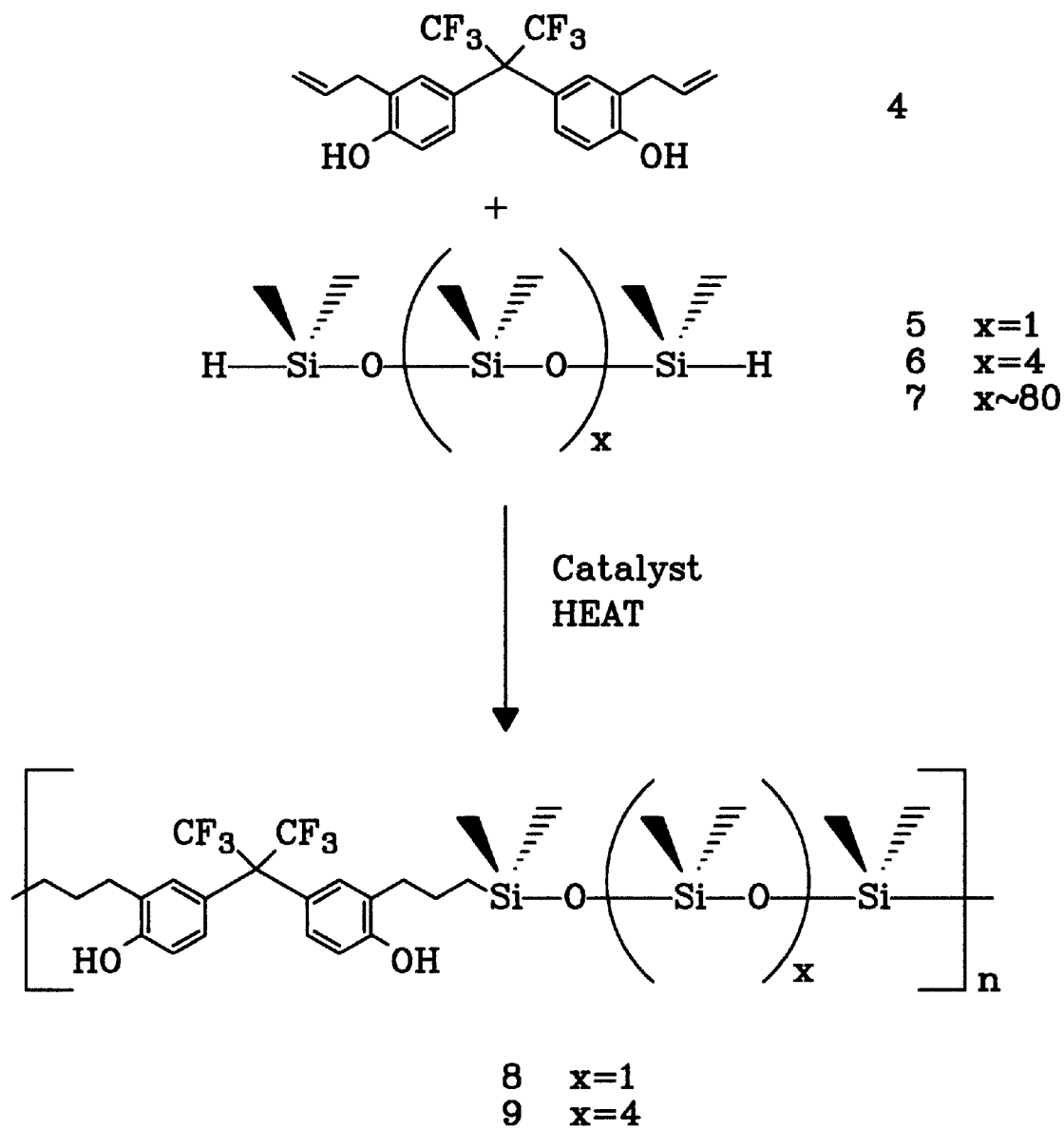
FIG. 3 is a chemical diagram of the synthesis of the present invention combining the fluorinated bisphenol with the oligosiloxane with a catalytic process.

The present invention is a strongly hydrogen-bond acidic sorbent oligomer or sorbent polymer having a having a glass-to-rubber transition temperature below 25° C. The sorbent polymer 100 is shown in FIG. 2 with fluorinated segments 102 containing interactive groups (A) and oligosiloxane segments 104 of oligosiloxane units (B) wherein the fluorinated segement 102 is a fluoroalkyl-substituted bisphenol, the oligosiloxane segment 104 is an oligodimethylsiloxane; and the fluoroalkyl-substituted bisphenol alternates with the oligosiloxane in the polymer 100 connected by a carbon chain 106. The carbon chain 106 has from 2 to 6 carbon atoms. The oligosiloxane has 2 to many silicon atoms, and is derived from a monomer that is terminated with Si—H groups as shown in FIG. 3. The fluoroalkyl-substituted bisphenol has trifluoromethyl groups, but other electron withdrawing groups are possible, and it is derived from a bis(allyl)-substituted hexafluorobisphenol-A as shown in FIG. 3. The substituents on the silicon are typically methyl but may also be other alkyl, aromatic, or alkylaromatic substituents such as ethyl or phenyl.

According to the present invention, the method of making the polymer is hydrosilylation having the steps of (a) preparing a solution of monomers consisting of a bis(allyl)-substituted fluorinated bisphenol and an organosiloxane with terminal Si—H groups in a first organic solvent (b) adding a metal hydrosilylation catalyst and (c) allowing the monomers time to react to produce an oligomer or polymer. The reaction may be heated as necessary to promote the reaction. The consumption of the Si—H function may be monitored by infrared spectroscopy to monior the course of the reaction. The initial ratio of the monomers may be selected to control the molecular weight distribution of the product. Additional monomers may be added during the reaction to promote chain lengthening. Use of excess oligosiloxane results in a polymer terminated with Si—H groups on each end. Use of excess bis(allyl)-substituted fluorinated bisphenol results in a polymer terminated with allyl groups on each end. Polymers terminated with vinyl groups on each end may be obtained by an excess of a divinyl substitured oligosiloxane to the polymer prepared with Si—H chain ends, for example 1,3-divinyltetramethyldisiloxane. The polymer is recovered by removing the catalyst from solution and removing the solvent, leaving the polymer. The hydrosilylation reaction can be initiated or catalyzed in several ways, with metal catalysis being most common. The catalyst can be metal salts, supported metals, or transition metal complexes. Hexachloroplatinic acid is the typical metal salt, while Pt on carbon is the most widespread supported catalyst for hydrosilylation of carbon-carbon multiple bonds. Other supported metals that can be used include Pd, Ni, Rh, Ru, and Ir on carbon or alumina. A great variety of transition metal complexes can be used for the homogeneous catalysis of hydrosilylation. Pt and Rh complexes predominate, but complexes of Pd, Ni, Rh, Os, Ir and Co have been demonstated to be useful as well. Pt divinyltetramethylsiloxane complex and Pt cyclovinylmethylsiloxane complexes are preferred hydrosilyation catalysts.

Referring to FIG. 3, in a preferred embodiment, the fluorinated bisphenol is 2,2-bis(3-allyl-4-hydroxyphenyl) hexafluoropropane 4 (same as 1b) and the organosiloxane includes but is not limited to 1,1,3,3,5,5-hexamethyltrisiloxane 5 (same as 2), 1,1,3,3,5,5,7,7,9,9,11, 11-dodecamethylhexasiloxane 6, hydride terminated poly (dimethylsiloxane), or combinations thereof.

The catalyst is a Pt catalyst which is preferably a vinyl-complexed Pt catalyst, for example platinum-1,3-divinyltetramethyldisiloxane or a cyclovinylmethylsiloxane Pt. According to the present invention, the molar ratio of reacting functional groups may be varied to influence the molecular weight distribution. For high molecular weight polymer, the ratio r=[SiH]/[CH$_2$=CH is preferably within the range of 0.9 to 1.1, most preferably 1.0. For lower molecular weitght polymers or oligomers, the ratio may be as low as 0.1 or as high as 10, preferably 0.5 to 2. Heating promotes polymerization by the hydrosilylation reaction. Temperature may range from room temperature of about 22° C. to about 150° C., and may be done in one stage or several stages. In the preferred method, one heating stage at 100° C. is used.

The polymer is recovered from the solution by first removing the catalyst, which may be done by adsorbing the catalyst on activated charcoal and filtering. This is followed by removing the organic solvents. Solvent removal may be by rotary evaporation. Optionally, the solvent may be removed by heating and evaporating the solvent.

Polymers 8 and 9 are preferably synthesized from the reaction of a mixture of 2,2-bis(3-allyl-4-hydroxyphenyl) hexafluoropropane 4 with SiH-terminated trisiloxane 5 and SiH-terminated hexasiloxane 6, respectively. It is preferred that the mixture be heated to at least room temperature (22° C.) for sufficient energy to promote the reaction of fluorinated 4 with 5. The temperature to which the mixture may be heated is limited only by any undesireable side reactions or thermal decomposition of the constituents of the mixture. An operative temperature range is from about 40° C. to about 120° C.

The syntheses of polymers 8 and 9 incorporated the fluoroalkyl-substituted phenol functionality from 4 into sorbent polymers that have Tg values below room temperature (6 and −16° C. respectively). Sorbent polymers 8 and 9 are adequate sorbents for basic vapors and suitable as materials for SAW vapor sensors. However, for application as chemically sensitive claddings on optical fibers, polymers 8 and 9 are too viscous for processing in the cladding apparatus, and their refractive indices are too high. At indices of 1.482 and 1.471 for 8 and 9 respectively, these claddings would not guide light down a silica fiber with a refractive index of approximately 1.46.

Figure 4:
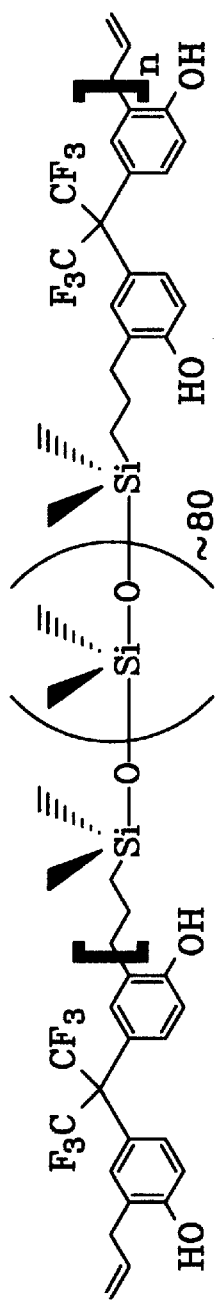
FIG. 4 is a chemical diagram of the sorbent polymer designated as material 10.

Accordingly, sorbent polymer 10 (FIG. 4) with a viscosity in the range of 1500 cSt. and a refractive index of 1.422 having a much longer polysiloxane linker (ca. 80 dimethylsiloxane links) is preferred for cladding an optical fiber. Allyl-terminated material 10 is obtained from the reaction of hydride-terminated polydimethylsiloxane 7 with two equivalents of 4 at elevated temperature with a catalyst.

All of the sorbent polymers materials described above can be prepared with terminal olefin groups, either by having the allyl groups of 4 on both ends of the polymer chain, or by subsequent reaction with 1,3-divinyltetramethyldisiloxane. Crosslinking can then proceed by linking sorbent polymer or sorbent oligomer chain ends using a hydrosilylation catalyst and a crosslinker with multiple (3 or more) SiH groups. According to the present invention, it is critical that the crosslinking reaction does not convert the liquid material to a glass. Hence, crosslinking is only at the polymer chain ends so that the liquid character of the material is maintained at a microscopic level, preserving rapid diffusion of vapors to and from sites for hydrogen-bonding interactions.

Figure 5:
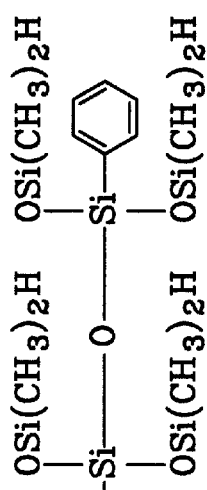
FIG. 5 is a chemical diagram of crosslinkers.
Figure 5:
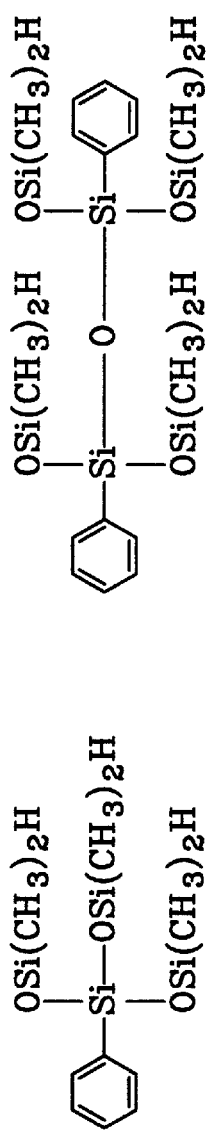

Choosing a suitable crosslinking agent is important since organosiloxane liquids with different types of organic funtionality are often not miscible. Cross linking agents (FIG. 5) phenyltris(dimethylsiloxy)silane (11) and 1,3-diphenyl-1,1,3,3-tetrakis(dimethylsiloxy)disiloxane (12) are both miscible with polymers 8, 9, and 10. By combining polymer, crosslinker, and hydrosilylation catalyst, the sorbent polymers are crosslinked in bulk samples, converting sticky gums or oils to solid elastomers. Similarly, thin films of these sorbent polymers may be crosslinked.

Thin films of these sorbent polymers may be applied to planar chemical sensors (SAW devices), silica optical fibers, and to the interior surfaces of silica capillaries. On SAW devices, it has been demonstrated that these materials are good sorbents for basic vapors and vapor diffusion is rapid. These sensors are more sensitive and faster to respond than fluoropolyol-coated SAW sensors.

Materials and Instrumentation Used for Examples

These materials, instrumentation and procedures were used in the following examples.

Materials

Solvents and reagents obtained from commercial sources were used as received. 2,2-Bis(3-allyl-4-hydroxyphenyl) hexafluoropropane was obtained from Organic Consultants, Inc., Eugene, Oreg., who characterized their product by IR and NMR, and confirmed the purity by gas chromatography.

They prepared it according to the method described by Abraham.[12] Platinum catalysts were obtained from United Chemical Technologies, including platinum divinyldisiloxane complex in xylene (PC072) and platinum cyclovinylmethylsiloxane complex (PC085). Both catalysts are reported to contain 2–3% platinum. Dodecamethylhexasiloxane was prepared using the method of Uchida.[15] All other siloxanes were obtained from United Chemical Technologies or Gelest.

Characterization Methods

Spectroscopic charaterization was obtained on a Nicolet 740 FT-IR spectrometer, a Varian VXR-300 NMR spectrometer and a Perkin-Elmer 552A UV/VIS spectrophotometer. Thermal analysis was performed under nitrogen on a Seiko SSC/5200 equipped with DSC 220C and TA/DTA 320 modules. Tg is reported as the inflection point in the DSC trace. $T_d$ is reported as the point of 10% weight loss. Viscosity was measured with a Bohlin VOR Rheometer. Refractive index was measured on a Leica Mark II Abbe Refractometer. Elemental analyses were obtained from Galbraith Laboratories, Inc., Knoxville, Tenn. Gel permeation chromatography (GPC) results were obtained from Scientific Polymer Products, Inc., Ontario, N.Y. Samples were analyzed on a Pnenomenex linear 500 Å–$10^6$ Å column at 30° C. using THF as the mobile phase. Molecular weights are referenced relative to polystyrene standards.

SAW Resonators, Oscillators, and Frequency Data Collection

The SAW devices used in this study were 200 MHz two-port resonators made of ST-cut quartz with aluminum metallization and a thin silicon dioxide overcoat. The SAW resonators and oscillator electronics to drive them were obtained from Femtometrics, Costa Mesa, Calif. Frequency measurements were made using a Hewlett-Packard 53131A High Performance Universal Counter with a medium stability timebase, transferring the data to a Macintosh computer using the IEEE-488 bus and collecting data with Labview software. Sensor temperatures were controlled using a single brass heat sink clamped against the lids of both the sampling sensor (array) package and the reference device package. Water from a refrigerated circulating water bath circulated through the brass heat sink. Temperatures were monitored with a Type K thermocouple (0.005 inch diameter, Omega) in contact with the header. All experiments were conducted with the sensor temperature at 25° C.

Vapor Generation

Vapor streams were generated from bubbler sources that were maintained at 15° C. in machined aluminum blocks with inlets and outlets for water from a refrigerated circulating water bath. The carrier gas for bubbler vapors and dilution of saturated vapor streams was dry nitrogen. The saturated bubbler vapor streams were diluted with additional carrier gas to obtain the desired vapor concentrations. The gas output to the sensor during testing is either the diluted vapor stream or clean carrier gas, each at a flow rate of 100 mL/min.

Vapor exposure experiments were carried out by first generating and equilibrating a vapor stream for 20 min while delivering clean carrier gas to the sensor. Vapor was then delivered to the sensor for 5 to 10 min, followed by 10 to 20 min of clean carrier gas for sensor recovery, followed by one or two additional vapor exposures. After each experiment, the system was flushed with clean carrier gas output to sensor to remove the previous vapor concentration. The frequency shift data reported in this paper represent the absolute value of the difference between the sensor baseline frequency under clean carrier gas and the steady state signal during vapor exposure. All such frequency shifts were in the correct direction for a mass-loading response of the SAW sensor.

EXAMPLE 1

Experiments were conducted to synthesize polymers 8 and 9 from the reaction of 2,2-bis(3-allyl-4-hydroxyphenyl) hexafluoropropane 4 with SiH-terminated trisiloxane 5 and SiH-terminated hexasiloxane 6, respectively. The reaction of fluorinated 4 with 5 proceeded very slowly or not at all at or below room temperature. Upon heating to reflux in methylene chloride (40° C.), the reaction proceeded mostly to completion in under an hour, as indicated by reduced intensity of the SiH peak at 2128 $cm^{-1}$ in the IR spectrum. At this point, the reaction slowed down dramatically. After several days of reflux the SiH peak never completely disappeared, even when a slight excess of 4 was used. Under similar conditions, the reaction of 4 with dodecamethylhexasiloxane 6 was slower than the reaction with trisiloxane 5 with no noticible reaction at room temperature or below. Significant rate enhancements were achieved at higher temperatures by conducting the reactions in toluene above 100° C. With a slight excess of 4, all SiH functionality was consumed in under an hour in the case of 3 and within several hours in the case of 6.

With these conditions established, polymers 8 and 9 were prepared using the "one monomer deficient method", wherein the molar ratio of reacting functional groups r=[SiH]/[$CH_2$=CH] was initially set to a value less than one, and additional oligosiloxane monomer was added after consumption of Si—H groups. Thus, when 4 and 5 were mixed together in the synthesis of 8, the molar ratio of reacting functional groups r=[SiH]/[$CH_2$=CH] was initially set to 0.95. When IR analysis indicated complete consumption of SiH functionality, an additional amount of 5 was added to increase r to 0.98. The process was continued until the SiH peak failed to disappear, which occurred when r=1.18. The significant excess of 5 required to obtain a persistent SiH peak is probably due to evaporative loss of the slightly volatile trisiloxane. All remaining SiH functionality was consumed by the addition of excess 1,3-divinyltetramethyldisiloxane and heating for several hours. (Olefinic end groups were also desired so that the polymer could be crosslinked by hydrosilylation, see below.)

The reaction rate in the synthesis of polymer 9 from 4 and 6 was slower. When r reached 0.98, approximately 24 hours of heating above 100° C. was required to consume all SiH functionality. Addition of 6 was discontinued at this point and product was recovered. Because bisphenol 4 was in excess and the SiH functionality disappeared, this material is terminated in allyl groups.

The synthesis of the present invention is selective for hydrosilyation polymerization over the competing dehydrocondensation reactions. Spectroscopic characterization of 8 and 9 (as well as 10 (FIG. 4), described below) indicated reasonably clean formation of the desired polymers with no major impurities present other than cyclic oligomers. The IR spectra clearly showed hydroxyl groups in the products. $^1H$ and $^{13}C$ NMR spectra provided diagnostic data on the conversion of allyl groups to trimethylene linkers, and representative spectra of polymer 9 are shown in FIG. 3b-i, FIG. 3b-ii. Peaks similar to the allyl methylene peak of 4 at 3.4 ppm in the $^1H$ NMR spectra and 35.1 ppm in the $^{13}C$ NMR spectra are not present in the sorbent polymer. Product methylene groups are clearly seen at 2.6, 1.6, and 0.6 ppm in the $^1H$ NMR spectrum, and at 33.5, 23.6, and 17.8 ppm in the $^{13}C$ NMR spectrum.

GPC analysis of polymer 8 indicated a bimodal weight distribution with a broad peak of high molecular weight ($M_w$=116,800, $M_n$=10,300, $M_w/M_n$=11.4) and a relatively narrow peak of low molecular weight ($M_w$=940, $M_n$=890 $M_w/M_n$=1.1). The low molecular weight peak is indicative of cyclic oligomers which could not be removed by vacuum. The sample contained approximately 80% of the higher molecular weight linear polymer as determined from the peak areas. The GPC data of polymer 9 also shows a bimodal weight distribution with high ($M_w$=120,100, $M_n$=12,200, $M_w/M_n$=9.8) and low ($M_w$=1,200, $M_n$=1,200, $M_w/M_n$=1.0) molecular weight peaks. In this case the high molecular weight linear polymer was 85–90% of the samples tested. The weight-average molecular weights observed for polymers 8 and 9 are higher than the value reported by Mathias for his bisphenol-containing copolymers ($M_w$=ca. 27000 by GPC and polydispersity of 12)[13] and roughly comparable to the highest molecular weight polymers obtained by Dvornic ($M_v$=75,900) as determined by intrinsic viscosity measurements.[14] Dvornic described his materials as "truly high molecular weight linear polycarbosiloxanes".

The syntheses of polymers 8 and 9 incorporated the fluoroalkyl-substituted phenol functionality from 4 into polymers and the resulting polymers had Tg values below room temperature (6 and −16 C respectively). These polymers proved to be good sorbents for basic vapors and suitable as materials for SAW vapor sensors. However, for application as chemically sensitive claddings on optical fibers, polymers 8 and 9 were too viscous for processing in the cladding apparatus, and their refractive indices were too high. At indices of 1.482 and 1.471 for 8 and 9 respectively, these claddings would not guide light down a silica fiber with a refractive index of approximately 1.46.

Polymer 8

1,1,3,3,5,5-hexamethyltrisiloxane 5 (0.566 g, 0.00272 mol) was added to a magnetically stirred solution of 2,2-bis(3-allyl-4-hydroxyphenyl)hexafluoropropane 4 (1.192 g, 0.00286 mol) in 20 ml toluene, giving a molar ratio of reacting functional groups, r=[SiH]/[CH$_2$=CH], equal to 0.95. One drop of the platinum-1,3-divinyltetramethyldisiloxane catalyst in xylene was added and the solution was heated to 100–112° C. in an oil bath. The disappearance of Si—H (2127 cm$^{-1}$) was monitored by FTIR. After 20 min. all Si—H functionality had been consumed. Additional quantities of 5 (to a total of 0.736 g 0.00353 mol, r=1.18) were repeatedly added to the heated reaction mixture until excess Si—H functionality was detected. Finally, excess 1,3-divinyltetramethyldisiloxane (0.057 g, 0.00031 mol) was added to insure that all polymer chains would be terminated with allyl or vinyl functionality, and the mixture was heated for an additional 2 h. Catalyst was removed by treating the reaction mixture with activated charcoal and then filtering. After removal of solvent by rotary evaporation, residual volatiles were removed by heating under vacuum for 19 h at 60° C., and then for 40 min at 138–143° C. Yield 1.717 g, 86%. The GPC data indicate a bimodal mass distribution; for peak 1 (79% peak area), $M_w$=116,800, $M_n$=10,300 ($M_w/M_n$=11.4); for peak 2 (20% peak area), $M_w$=940, $M_n$=890 ($M_{w/Mn}$=1.1). Anal. Calc: C, 51.90; H, 6.13; F, 18.24. Found: C, 50.66; H, 6.05; F, 17.33. $n^{22}$=1.482. FTIR (neat) 3607, 3430, 3075, 3043, 2958, 2928, 2873, 2797, 1612, 1508, 1428, 1343, 1253, 1214, 1191, 1133, 1050, 964, 922, 838, 798, 761, 741, 716 cm$^{-1}$. $^1$H NMR (CDCl$_3$) δ7.37 (d), 7.07–7.13 (m, 4H), 6.88 (br), 6.79 (d), 6.72 (d, 2H), 5.34 (br, 2H), 5.03 (br, 2H), 2.53–2.61 (m, 4H), 1.56–1.61 (m, 4H), 0.49–0.58 (m, 4H)–0.02–0.10 (m). $^{13}$C NMR (CDCl$_3$) δ153.8, 133.0, 123.4, 129.2, 129.1, 128.2, 128.1, 125.6, 124.5 q (CF3), 114.8, 114.6, 63.7 hept. ($C^{CF}3$), 33.5, 33.3, 23.6, 23.1, 18.0, 17.8, 1.2, 1.0, 0.1, −0.3. $^{19}$F NMR (CDCl$_3$) δ−77.23 (relative to CFCl$_3$ standard). UV (MeOH) e$_{max}$, 4,500; λ$_{max}$, 275 nm, e$_{max}$, 4,300; λ$_{max}$, 282 nm. T$_g$(DSC): 6° C. T$_d$(TGA): 350° C.

Polymer 9

1,1,3,3,5,5,7,7,9,9,11,11-dodecamethylhexasiloxane 6 (1.961 g, 0.00455 mol), 4 (1.995 g, 0.00479 mol), and one drop platinum-1,3-divinyltetramethyldisiloxane catalyst were reacted in in 40 ml toluene at 100–110° C. (r=8 SiH]/[CH$_2$=CH]equal 0.95). Si—H functionality was greatly diminished but still visible after 30 min., and was just visible at the baseline after another hour. The mixture was heated 16.5 more hours, followed by addition of 6 (0.062 g, 0.00014 mol) to increase r to 0.98. After another 24 h of heating the Si—H peak had diminished to the point where it was barely distinguishable from the baseline. Further polymerization was not attempted. After treatment with activated charcoal, filtration, and rotary evaporation, the product was heated under vacuum at 60° C. for 72 h and 139–144° C. for 1.5 h. The product (3.546 g, 88%) is a thick, yellow oil. The GPC data indicate a bimodal mass distribution; for peak 1 (86% peak area), $M_w$=120,100, $M_n$=12,200 ($M_w/M_n$=9.8); for peak 2 (8% peak area), $M_w$=1,200, $M_n$=1,200 ($M_w/M_n$=1.0). Anal. Calc: C, 46.78; H, 6.66; F, 13.45. Found: C, 46.67; H, 6.40; F, 13.00. $n^{20}$=1.471. FTIR (neat) 3612, 3443, 3074, 3042, 2961, 2929, 2873, 2798, 1612, 1509, 1428, 1344, 1259, 1211, 1133, 1058, 965, 922, 860, 837, 803, 742, 715 cm$^{-1}$. $^1$H NMR (CDCl$_3$) δ7.04–7.17 (m, 4H), 6.70–6.76 (m, 2H), 5.22 (br, 2H), 2.60 (t, 4H), 1.61 (quint., 4H), 0.56 (t, 4H), 0.06 (s, 12H), 0.04 (s, 12H), 0.03 (s, 12H). $^{13}$C NMR (CDCl$_3$) δ153.9, 132.4, 129.2, 127.9, 125.5, 124.4 q (CF$_3$), 114.8, 63.6 hept. ($C^{CF}_3$), 33.5, 23.6, 17.8, 1.1, 0.1. $^{19}$F NMR (CDCl$_3$) δ−77.19 (relative to CFCl$_3$ standard). UV: e$_{max}$, 4,400; λ$_{max}$, 276 nm, e$_{max}$, 4,300; λ$_{max}$, 282 nm. T$_g$(DSC): −16° C. T$_d$(TGA): 377° C.

EXAMPLE 2

An experiment was conducted to synthesize a sorbent polymer with a reduced index of refratction for optical cladding that would guide light down a silica fiber with a refractive index of approximately 1.46.

Accordingly, sorbent polymer 10 (FIG. 4) was prepared as a liquid material with a viscosity in the range of 1500 cSt. and a refractive index of 1.422 using a much longer polysiloxane linker (ca. 80 dimethylsiloxane links) under conditions leading to a lower molecular weight product. Allyl-terminated material 10 was obtained from the reaction of hydride-terminated polydimethylsiloxane 7 with two equivalents of 4. Consumption of all SiH-containing starting materials was complete within two hours due to the large excess of vinyl functionality. Based on the stoichiometry and assuming a material with a polydispersity of 1, the product would have the structure as shown for 10 in FIG. 4 with n=1 and the molecular weight would be about 7000. The actual product in the small scale synthesis had a polydispersity of 2.2 and number average molecular weight of 15400;this corresponds roughly to a material consisting of two polydimethylsiloxane spacers from 5 and three bisphenol groups, noting that there was no SiH detectable in the product. In a separate larger scale synthesis, we obtained a material with a number average molecular weight of 12,300 and polydispersity of 2.1.

Material 10

Hydride terminated poly(dimethylsiloxane) 7 (8.671 g, $M_n$=6000) and one drop platinum-1,3- divinyltetramethyldisiloxane complex were added to 4 (1.208 g, 2.901 mol) in 40 ml toluene and the solution was heated to 110–120° C. Si—H functionality was undetectable after for 40 min. Treatment with activated charcoal, filtration, and rotary evaporation yielded the product (9.705 g, 98%) as a light yellow fluid of moderate viscosity (~1500 cSt. measured by rheometer). GPC gave monomodal distribution with $M_w$=34,300 and $M_n$=15,400 ($M_w/M_n$=2.2). Anal. Calc: C, 35.51; H, 7.64; F, 3.34. Found: C, 35.49; H, 7.47; F, 3.11. $n^{20}$=1.422. FTIR (neat) 3827, 3763, 3701, 3614, 3460, 3080, 3041, 2962, 2905, 2801, 1945, 1613, 1512, 1413, 1345, 1260, 1214, 1189, 1093, 1024, 864, 800, 744, 704, 662 cm$^{-1}$. $^1$H NMR (CDCl$_3$) δ07–7.14 (m, 4H), 6.70–6.79 (m, 4H), 5.90–6.16 (m), 5.08–5.35 (m), 3.37 (d), 2.59 (t, 4H), 1.58–1.64 (m, 4H), 0.55 (t, 4H), −0.12–0.27 (m). $T_d$(TGA): 400° C.

EXAMPLE 3
Crosslinking of 8, 9 and 10

Polymers 8 and 9 were crosslinked with 1,3-diphenyl-1,1,3,3-tetrakis(dimethylsiloxy)disiloxane (12) and phenyltris(dimethylsiloxy)silane (11), respectively, in an analogous fashion. Due to the high viscosity of 8 and 9, the polymer, crosslinker and catalyst were first dissolved in a few drops of CH$_2$Cl$_2$ to promote mixing. The vials were then placed on a hot plate on low heat for 1 h to remove most of the solvent prior to degassing. Crosslinking at 100° C. under an N$_2$ converted these materials from sticky gums or oils to solid elastomers. SiH to vinyl ratios in these various crosslinking reactions generally varied from 1:1 to 1.5:1.

Polymer 10 (1.239 g), phenyltris(dimethylsiloxy)silane (11) (0.040 g, 0.00012 mol) and platinum-cyclovinylmethylsiloxane complex (0.0008 g, 16 ppm) were mixed together in a glass vial and degassed by evacuating and purging with N$_2$ several times. The vial was heated to 100° C. for 1 h under an N$_2$ flow, converting the pourable liquid to a solid transparent elastomer.

EXAMPLE 4
Applying a Thin Film to a SAW Device

The SAW devices were always cleaned in a Harrick plasma cleaner prior to polymer film application. Spray-coated polymer films were applied to the SAW device using an airbrush supplied with compressed dry nitrogen and a dilute solution (0.2% by weight) of the polymer in chloroform. The frequency change of the SAW device operating in an oscillator circuit was monitored during deposition, using the change in frequency as a measure of the amount of material applied. After application, the films were annealed at 50° C. overnight in an oven. Spray-coated films were always examined by optical microscopy with a Nikon microscope using reflected light Nomarski differential interference contrast.

EXAMPLE 5
Detection of Basic Vapors with a Polymer-coated SAW Device

Figure 6:
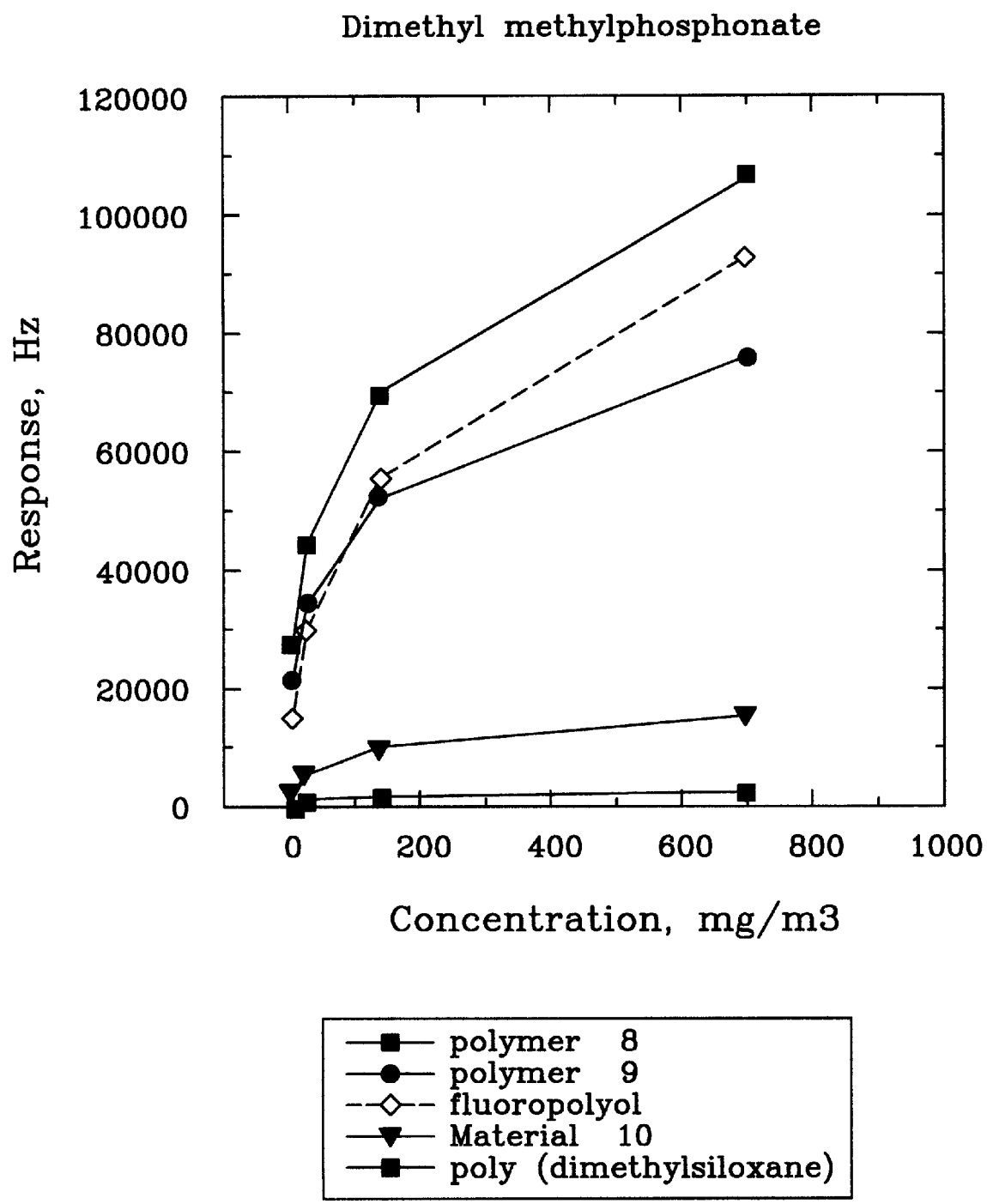
FIG. 6 is a graph of calibration curves for polymer-coated SAW sensors dimethyl methylphosphonate. The sensor responses were first normalized to equivalent film "thicknesses" of 250 kHz

The polymers were applied to SAW devices (without crosslinking) and tested against organic vapors at various concentrations. Upon exposure to a vapor, polymer-coated acoustic wave devices undergo a shift in frequency that is proportional to the amount of vapor sorbed by the polymer. Times to steady state response, corresponding to equilibrium partitioning of the vapor into the film, were under 10 seconds using a vapor delivery system. From frequency shift data for a vapor at multiple concentrations, calibration curves were constructed. FIG. 6 shows the calibration curves for polymers 8, 9, and 10 against dimethyl methylphosphonate (DMMP), a strongly hydrogen-bond basic organophosphorus compound. In addition, data are also provided for a polydimethylsiloxane-coated SAW device and a fluoropolyol-coated device. These data are all normalized to a film "thickness" of 250 kHz for each material. At trace DMMP concentrations, polymer 8, with the greatest density of hydrogen-bond acidic sites, shows the highest sensitivity to DMMP, followed by polymer 9. Signals of greater than 20,000 Hz were observed at a concentration of only 8 mg/m$^3$. This corresponds to a concentration of 1–2 ppm, indicating that detection limits for a minimum detectable signal of 10 Hz would be at about 1 ppb. Material 10, with a lower density of hydrogen-bond acidic sites, is less sensitive than polymers 8 and 9. All the bisphenol-containing materials are more sensitive to DMMP than polydimethylsiloxane, illustrating the significance of incorporating the hydrogen-bond acidic organic functionality in promoting sorption of basic vapors. The increase in sensitivity with increasing density of phenolic groups (as well as the very large signals) demonstrates that the responses are due to bulk absorption in the film. The calibration curves are nonlinear, which is consistent with hydrogen-bonding interactions at a finite number of sites in the polymer. The calibration curves also show that at trace concentrations new materials 8 and 9 are superior to fluoropolyol, which has been the most useful hydrogen bond acidic polymer in previous SAW sensor studies.

Figure 7:
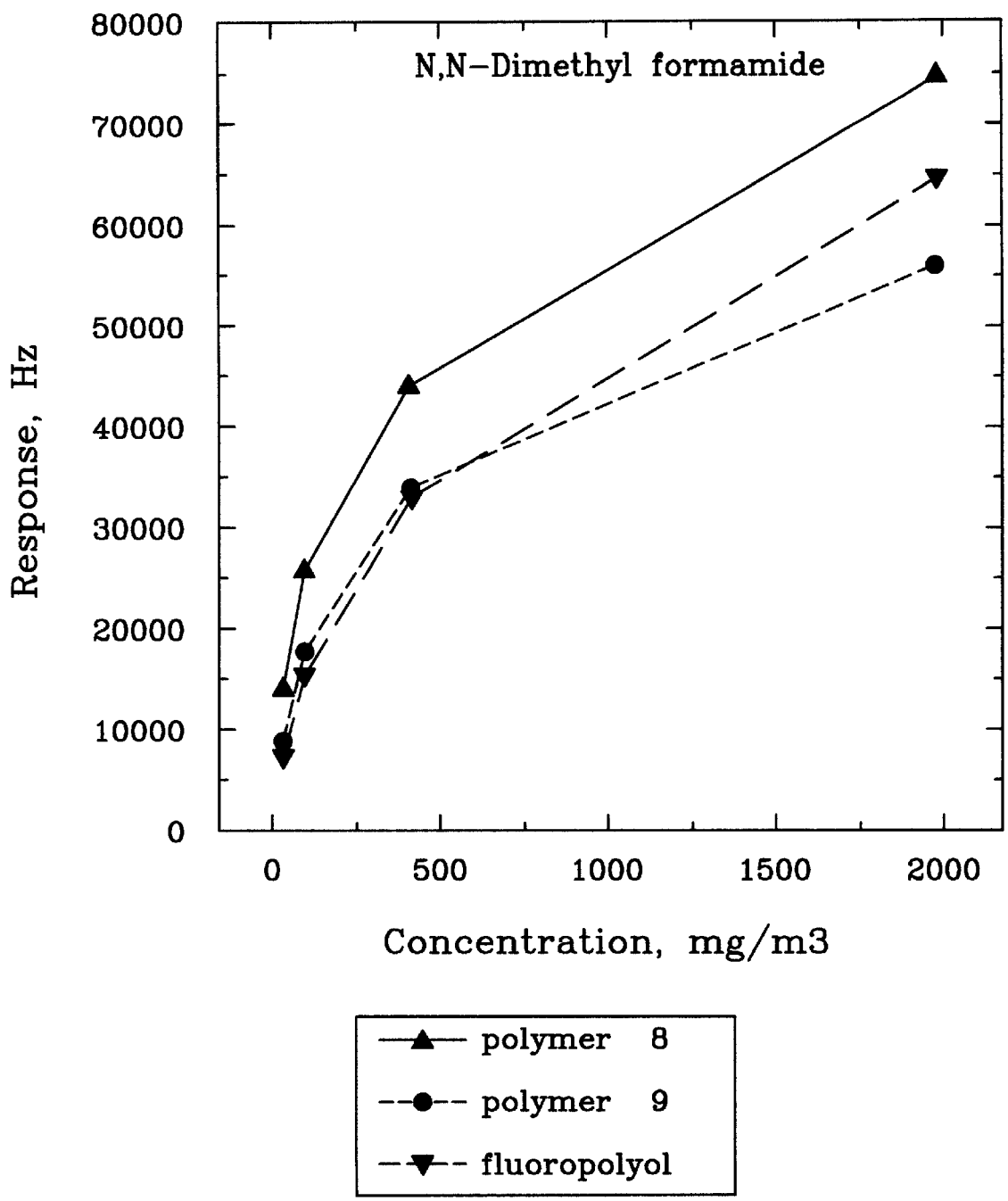
FIG. 7 is a graph of calibration curves for polymer-coated SAW sensors to N,N-dimethylformamide. The sensor responses were first normalized to equivalent film "thicknesses" of 250 kHz.
Figure 8:
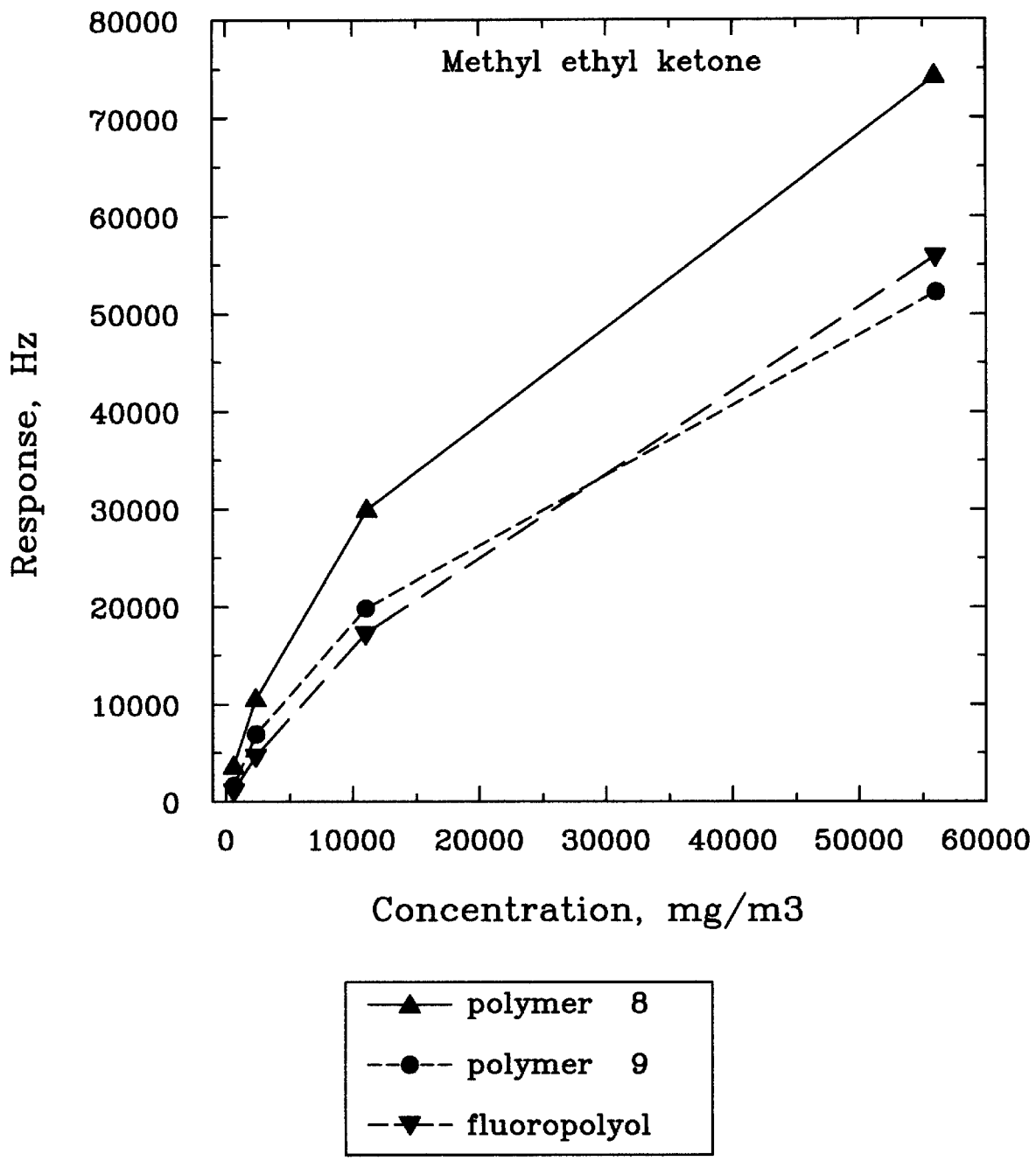
FIG. 8 is a graph of calibration curves for polymer-coated SAW sensors to methyl ethyl ketone. The sensor responses were first normalized to equivalent film "thicknesses" of 250 kHz.

Calibration curves for other basic organic vapors N,N-dimethylformamide and methyl ethyl ketone are compared in FIGS. 7 and 8. SAW sensors coated with polymer 6 are more sensitive than fluoropolyol-coated sensors in each case.

EXAMPLE 6
Response Time Comparison

Figure 9:
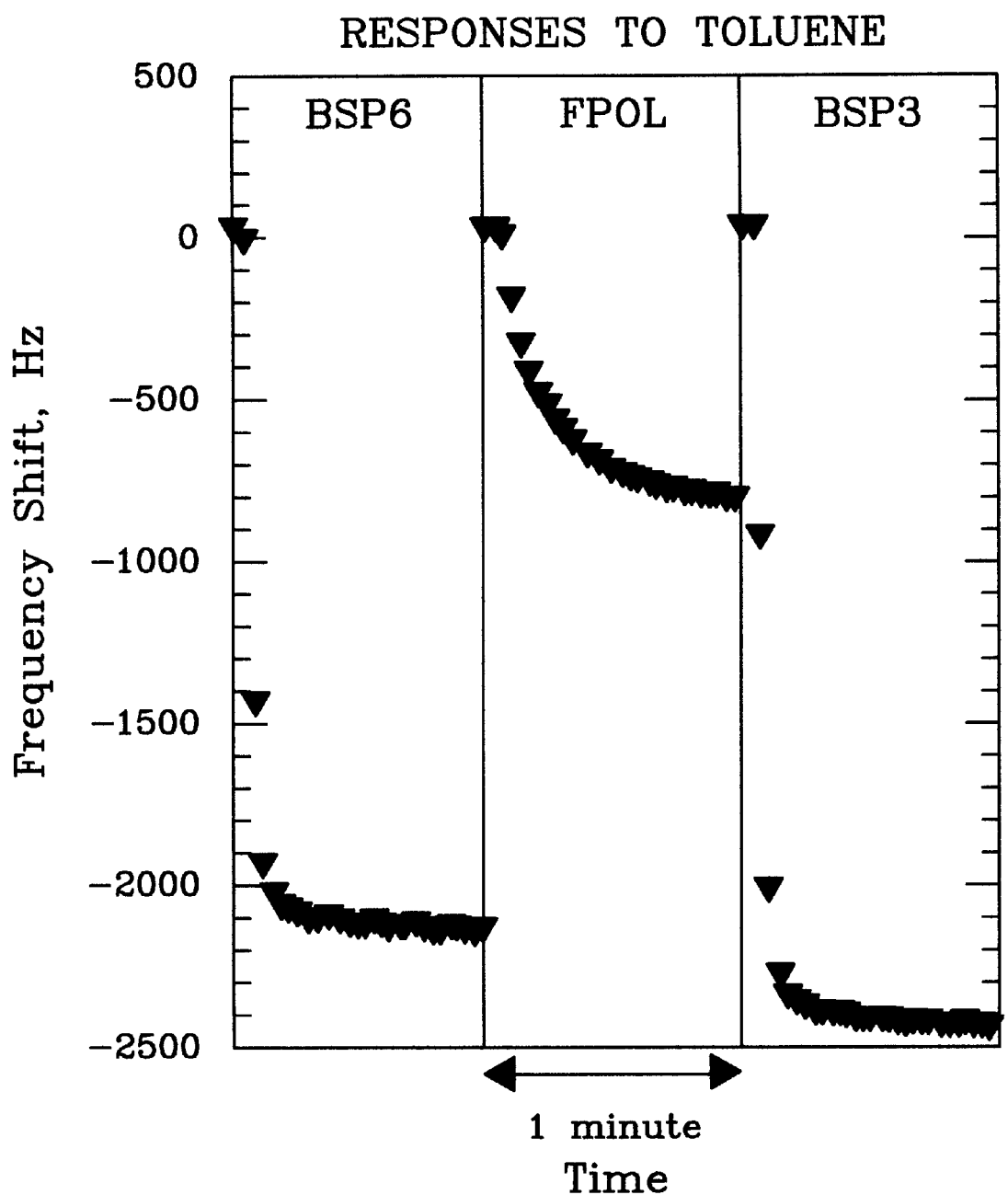
FIG. 9 is a graph showing the response times of SAW devices coated with three hydrogen-bond acidic polymers to toluene at 4380 mg/m3. The amounts of sorbent polymer on each sensor are fluoropolyol (FPOL), 173 kHz; sorbent polymer 9 (BSP6), 201 kHz; and sorbent polymer 8 (BSP3), 196 kHz. This graph shows the first minute of response following a valve operation that changes the output of the vapor generator from clean carrier gas to test vapor. Consecutive data points are two seconds apart.

The response times of individual SAW sensors coated with the hydrogen-bond acidic polymers were examined. Frequency data were collected every two seconds. The results for toluene vapor at 4380 mg/m3 concentration are shown graphically in FIG. 9, comparing sorbent polymer 8, 9, and fluoropolyol. Table 1 reports sensor responses to toluene and methyl ethyl ketone in terms of the fraction of the full response as a function of time for the first 30 seconds of exposure. These data clearly show that the fluoropolyol-coated sensor is indeed slower to respond (noting that all sensors were tested under identical conditions with regard to temperature, sensor packaging, and gas flow), and that this is true for both vapors. From Table 1 it is apparent that sensors coated with sorbent polymers 8 and 9 reach 90% of full response in six seconds of the first indication of a response, while the fluoropolyol-coated sensor only registers 50% or less of full response in the same time frame. Thus, the new polymers are superior to fluoropolyol in terms of response time.

TABLE 1

Response Times as a Fraction of Steady State Response

| Time, sec | BSP6 | FPOL | BSP3 |
|---|---|---|---|
| Responses to methyl ethyl ketone at 613 mg/m3 | | | |
| 0 | 0.00 | 0.00 | 0.00 |
| 2 | 0.00 | 0.00 | 0.01 |
| 4 | 0.46 | 0.09 | 0.48 |
| 6 | 0.84 | 0.34 | 0.79 |
| 8 | 0.90 | 0.49 | 0.88 |

TABLE 1-continued

Response Times as a Fraction of Steady State Response

| Time, sec | BSP6 | FPOL | BSP3 |
|---|---|---|---|
| 10 | 0.91 | 0.59 | 0.91 |
| 20 | 0.93 | 0.81 | 0.93 |
| 30 | 0.94 | 0.89 | 0.94 |
| Responses to toluene at 4380 mg/m3 | | | |
| 0 | 0.00 | 0.00 | 0.00 |
| 2 | 0.02 | 0.00 | 0.00 |
| 4 | 0.65 | 0.04 | 0.38 |
| 6 | 0.87 | 0.26 | 0.82 |
| 8 | 0.92 | 0.41 | 0.93 |
| 10 | 0.93 | 0.51 | 0.95 |
| 20 | 0.95 | 0.75 | 0.98 |
| 30 | 0.95 | 0.86 | 0.98 |

EXAMPLE 7
Optical Fiber Drawing and Cladding

Polymer 10 (38.7503 g, $M_n$=12,300) was combined with a trifunctional cross linker phenyltris(dimethylsiloxy)silane (11) (1.8468 g, 0.0055848 mol) and platinum cyclovinylmethylsiloxane complex (0.0239 g, corresponding to 0.0006 g Pt). The viscous mixture was stirred until well blended and degassed under vacuum. The viscous mixture was applied to a fused silica fiber as it was freshly drawn from a Heathway fiber drawing apparatus through a 205 mm Sandcliff cladding cup, and into a 45 cm long clamshell furnace for curing. The viscous mixture was supplied to the cladding cup under a pressure of 0.8 to 1.5 psi. The optimal furnace temperature and fiber draw speed were 520° C. and 8–9 m/min respectively. These conditions gave a fairly uniform coating that was light yellow in color and slightly tacky to the touch. The cyclovinylmethylsiloxane complex of platinum was chosen as the catalyst, rather than platinum divinyldisiloxane complex, because the cyclovinylmethylsiloxane complex cures more slowly, giving a longer pot life. Adequate curing of the polymers was acheived at the slow drawrates of 8–9 m/min; this drawrate necessitated manual control of the drawing conditions, resulting in variable core diameters and coating thicknesses. The polymer viscosity increased during the fiber drawing and the delivery pressure was increased from 0.8 to 1.5 psi over the course of about two hours. Half to one meter sections were hand selected for quality. The best fiber sections had a smooth 25 um thick coating over a 180 um diameter core. These fibers are as effective at guiding light as commercially available plastic fibers or silica fibers clad in a laboratory with commercial polydimethylsilicone cladding formulations.

EXAMPLE 8
Coating a Capillary Column

A 5% solution of 8 in chloroform was used to coat the interior surface of several 1-meter silica capillary columns with 100-micron inside diameter. The thickness and thickness uniformity were verified by sacrificing a coated column, cutting it into several pieces, and looking at the cross sections using a high power optical microscope. The thickness of 1 micron was in good agreement with theoretical film thickness ($\mu$m)=2.5×col.i.d.(mm)×conc. coating soln (%). To obtain 0.1 $\mu$m film thickness, we diluted the 5% BSP solution to 0.5% by dichloromethane and coated the interior of capillaries by the same method.

The procedure to coat the capillary (100-$\mu$m ID column, Fused Silica Intermediate Polarity, part number 2-5745, Supelco, Pennsylvania) involved filling the capillary with a solution of the polymer, closing one end of the capillary, and pulling a vacuum off the other end of the capillary at a fixed temperature. The solution filled column was placed into a gas chromatographic oven stabilized at 30° C. to control the temperature, and the vacuum was pulled using an oil-free Teflon-coated diaphragm pump (Fisher part number 13-875-217C), vacuum of −70 kPa was applied to the column for 17 hours.

EXAMPLE 9

An experiment was conducted to attempt a synthesis as taught by Mathias. A fluorinated bisphenol (compound 1b) was mixed with a trisiloxane (compound 5 (same as 2)) with a catalyst all in an ice bath. The reaction did not proceed in seconds to minutes as reported for non-flourinated bisphenol, but rather proceeded very slowly and did not go to completion.

To a magnetically stirred solution of 2,2-bis(3-allyl-4-hydroxyphenyl)hexafluoropropane (0.5563 g, 0.0013360 mol) (compound 1b) in 8 ml dichloromethane was added 1,1,3,3,5,5-hexamethyltrisiloxane (0.2635 g, 0.0012639 mol) (compound 5). This gave a molar ratio of reacting functional groups, r=[SiH]/[CH$_2$=CH], equal to 0.95. The reaction mixture was cooled in an ice bath, and then one drop of platinum-1,3-divinyltetramethyldisiloxane catalyst was added to intiate the reaction. The ice bath maintained temperatures between 2–8° C. for the duration of the ice bath cooled portion experiment. There was no indication, such as solvent boiling, of a highly exothermic reaction upon addition of the catalyst. Aliquots were removed for analysis by FTIR after 1 h, 2 h, 4 h and 6½ h. After 1 hour the intensity of the allyl C—H peak at 3081 cm−1 had decreased slightly and the intensity of the Si—H peak at 2128 cm−1 had also decreased, indicating partial reaction. However, significant Si—H remained. Observations at 2 h, 4 h and 6½ h. indicated little further reaction beyond that observed at 1 hr. Thus the reaction to produce polymer 8 did not go to completion at ice bath temperatures after 6½ h.

EXAMPLE 10

The reaction mixture in Example 9 was removed from the ice bath and the reaction mixture was stirred overnight, warming up to room temperature. By the following day (12–24 h), the dichloromethane solvent had completely evaporated. FTIR analysis of the reaction mixture indicated significant changes. The Si—H peak at 2128 cm−1 was barely visible above the baseline. The allyl C—H peak at 3081 cm−1 was also significantly diminished in intensity. The polymer was quite viscous.

An additional experiment was conducted to observe the reaction starting at room temperature and continuing at elevated temperatures.
BSP3 (Polymer 8)

To a magnetically stirred solution of 2,2-bis(3-allyl-4-hydroxyphenyl)hexafluoropropane (1.1420 g, 0.0027425 mol) (compound 1b) in 20 ml dichloromethane was added one drop platinum-1,3-divinyltetramethyldisiloxane complex and 1,1,3,3,5,5-hexamethyltrisiloxane (compound 5) (0.5449 g, 0.0026136 mol). This gave a molar ratio of reacting functional groups, r=[SiH]/[CH$_2$=CH], equal to 0.95. Prior to the addition of hexamethyltrisiloxane, the reaction mixture was placed in a water bath at room temperature. As in the previous example, an initial vigorous reaction was not observed. After 1½ h of stirring at room temperature, FTIR analysis of the reaction mixture showed an approximately 60–80% decrease in intensity of the Si—H peak at 2128 cm−1. The reaction mixture was heated to reflux (40° C.) for 1 h and then analyzed by FTIR. No noticeable change in Si—H peak intensity was evident at this point. The reaction mixture was heated to reflux for an additional 18 h. FTIR analysis of the reaction mixture indicated complete disappearance of the Si—H peak at 2128 cm−1.

At room temperature, the reaction to produce polymer 8 was not complete in 1.5 hours, nor was it complete after another hour at reflux temperature. Reaction at either room temperature or reflux temperature for an extended period of time was necessary to complete the reaction to produce polymer 8.

EXAMPLE 11

An experiment was conducted to investigate the synthesis of a sorbent polymer with a hexa-siloxane at ice bath temperature, at room temperature and higher temperatures. BSP6 (Polymer 9)

To a magnetically stirred solution of 2,2-bis(3-allyl-4-hydroxyphenyl)hexafluoropropane (compound 1b) (1.4860 g, 0.0035686 mol) in 15 ml dichloromethane was added three drops platinum-1,3-divinyltetramethyldisiloxane complex and 1,1,3,3,5,5,7,7,9,9,11,11-dodecamethylhexasiloxane (compound 6) (1.4590 g, 0.0033855 mol). This gave a molar ratio of reacting functional groups, r=[SiH]/[CH$_2$=CH], equal to 0.95. Prior to the addition of dodecamethylhexasiloxane, the reaction mixture was cooled in an ice bath to compensate for an anticipated evolution of heat. No evidence of a vigorous exothermic reaction (such as boiling solvent) was observed, so the ice bath was removed. After 2½ h of stirring at room temperature, FTIR analysis of the reaction mixture showed no noticeable decrease in intensity of the Si—H peak at 2128 cm−1.

An additional three drops of platinum-1,3-divinyltetramethyldisiloxane complex were added, and the reaction mixture was heated to reflux (40° C.) for 1 h. At this point, FTIR analysis of the reaction mixture indicated an approximately 70–80% decrease in intensity of the Si—H peak. The reaction mixture was heated to reflux for an additional 1½ h. FTIR indicated no apparent change in Si—H peak intensity. An additional drop of platinum-1,3-divinyltetramethyldisiloxane complex was added, and the reaction mixture was heated to reflux for 17 h. Once again, FTIR analysis of the reaction mixture indicated no apparent change in the Si—H peak intensity. Most of the dichloromethane solvent was removed by rotary evaporation.

The reaction mixture was heated to 80° C. in an oil bath for 30 min. FTIR analysis of the reaction mixture still indicated no apparent change in the Si—H peak intensity. Heating was halted. The reaction mixture was redissolved in dichloromethane, treated with activated charcoal and gravity filtered twice. The solvent was removed by rotary evaporation.

Reaction with hexa-siloxane did not go to completion under any of these conditions. Polymer 9 is preferably synthesized at higher temperatures as in Example 1.

CLOSURE

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A polymer of a sorbent polymer or sorbent oligomer having a glass-to-rubber transition temperature below 25° C., comprising:
   (a) a fluorinated bisphenol alternated with
   (b) an oligosiloxane with
   (c) a carbon chain connecting the fluorinated bisphenol with the oligosiloxane.

2. The polymer as recited in claim 1, wherein said carbon chain has from 2 to 6 carbon atoms.

3. The polymer as recited in claim 1, wherein said fluorinated bisphenol is a fluoroalkyl substituted bisphenol.

4. The polymer as recited in claim 1, wherein said oligosiloxane has at least two silicon atoms.

5. The polymer as recited in claim 4, wherein at least one of said at least two silicon atoms has a substituent selected from the group consisting of methyl, alkyl, allyl, aromatic, and combinations thereof.

6. The polymer as recited in claim 1, wherein the oligosiloxane is an oligodimethylsiloxane.

7. A method of making a polymer that is a sorbent polymer or sorbent oligomer, comprising the steps of:
   (a) preparing a solution of a bis(allyl)-substituted fluorinated bisphenol and an organosiloxane with terminal Si—H groups in a first organic solvent;
   (b) adding a metal hydrosilylation catalyst;
   (c) heating the catalyzed solution for a predetermined time and producing the polymer.

8. The method as recited in claim 7 wherein said heating is to a temperature of at least 22° C.

9. The method as recited in claim 8, wherein adding said solution includes an intial adding and a subsequent adding wherein said subsequent adding during the heating promotes a chain lengthening.

10. The method as recited in claim 7, wherein an amount of said oligosiloxane is in excess of a stoichiometric amount resulting in said polymer terminated with Si—H groups on each end.

11. The method as recited in claim 10, wherein the Si—H terminated polymer is further reacted with a divinyl substituted oligosiloxane producing the polymer terminated with vinyl groups.

12. The method as recited in claim 11, wherein siad divinyl substituted oligosiloxane is 1-3, divinyltetramethyldisoloxane.

13. The method as recited in claim 7, wherein an amount of said bis(allyl)-substituted fluorinated bisphenol is in excess of a stoichiometric amount resulting in said polymer terminated with allyl groups on each end.

14. The method as recited in claim 7, wherein said catalyst is selected from the group consisting of metal salts, supported metal, transition metal complex and combinations thereof.

15. The method as recited in claim 14, wherein said metal salt is hexachloroplatinic acid.

16. The method as recited in claim 14, wherein a support for said supported metal is selected from the group consisting of carbon, alumina and combinations thereof.

17. The method as recited in claim 14, wherein a metal for said supported metal is selected from the group consising of Pt, Pd, Ni, Rh, Ru, Ir and combinations thereof.

18. The method as recited in claim 14, wherein said transition metal complex is selected from the group consisting of M divinyltetramethylsiloxane complex, cyclovinylmethylsiloxane M complex and combinations thereof, wherein M is a transition metal.

19. The method as recited in claim 18, wherein the M is selected from the group consisting of Pt, Rh, Pd, Ni, Os, Ir, Co and combinations thereof.

20. The method as recited in claim 7, wherein said bis(allyl)-substituted fluorinated bisphenol is 2,2-bis(3-allyl-4-hydroxyphenyl)hexafluoropropane.

21. The method as recited in claim 7, wherein said organosiloxane is selected from the group consising of 1,1,3,3,5,5-hexamethyltrisiloxane, 1,1,3,3,5,5,7,7,9,9,11,11-dodecamethylhexasiloxane, hydride terminated poly (dimethylsiloxane), and combinations thereof.

22. The method as recited in claim 7, wherein a mole ratio of [SiH]/[CH$_2$=CH is from about 0.1 to about 10.

23. The method as recited in claim 22, wherein said mole ratio is from about 0.5 to about 2.

24. The method as recited in claim 22, wherein said mole ratio is from about 0.9 to about 1.1.

25. The method as recited in claim 7, wherein said heating is to a temperature from about 40° C. to about 120° C.

26. The method as recited in claim 25, wherein said heating is to a temperature from about 100° C. to about 110° C.

27. A polymer that is a sorbent polymer or sorbent oligomer having a glass-to-rubber transition temperature below 25° C., comprising:

(a) a fluorinated bisphenol alternated with (b) an oligosiloxane with (c) a carbon chain connecting the fluorinated bisphenol with the oligosiloxane;

made by the method as recited in claim 7.

* * * * *